United States Patent [19]

Seo

[11] Patent Number: 5,600,504

[45] Date of Patent: Feb. 4, 1997

[54] METHOD AND APPARATUS FOR DETECTING TAPE TERMINI IN A TAPE RECORDER

[75] Inventor: Byung-ryul Seo, Kyungki-do, Rep. of Korea

[73] Assignee: Samsung Electronics Co., Ltd., Suwon, Rep. of Korea

[21] Appl. No.: 350,161

[22] Filed: Nov. 30, 1994

[30] Foreign Application Priority Data

Dec. 28, 1993 [KR] Rep. of Korea ............... 93-30235

[51] Int. Cl.⁶ ............................................. G11B 15/18
[52] U.S. Cl. ................................. 360/74.2; 242/333.7
[58] Field of Search .............................. 360/74.2, 74.1; 242/333.7, 333.6, 333.1

[56] References Cited

U.S. PATENT DOCUMENTS

| | | | |
|---|---|---|---|
| 4,213,583 | 7/1980 | Mitani et al. | 242/333.7 |
| 4,341,364 | 7/1982 | Maddaloni | 242/333.7 |
| 4,502,647 | 3/1985 | Zweighaft et al. | 360/74.2 |
| 4,528,604 | 7/1985 | Koyama | 360/74.2 |
| 4,553,182 | 11/1985 | Narita | 360/74.2 X |
| 4,806,861 | 2/1989 | Urayama et al. | 360/74.2 X |
| 4,988,056 | 1/1991 | Shin | 360/74.2 X |
| 5,309,300 | 5/1994 | Lee | 360/74.2 |

*Primary Examiner*—W. R. Young
*Assistant Examiner*—James T. Wilson
*Attorney, Agent, or Firm*—Cushman Darby & Cushman, IP Group of Pillsbury Madison & Sutro LLP

[57] ABSTRACT

An apparatus for detecting the starting or ending terminus of a tape by determining the rotatory state of a reel, includes a supply reel pulse generator for generating first pulses in response to rotation of the supply reel, a take-up reel pulse generator for generating second pulses in response to rotation of the take-up reel, a supply reel stop state determination circuit for determining the stop state of the supply reel on the basis of the first pulses, a take-up reel stop state determination circuit for determining the stop state of the take-up reel on the basis of the second pulses, and a tape terminus detection circuit for detecting the starting or ending terminus of the tape on the basis of the outputs of the supply and take-up reel stop state determination circuits. The apparatus for detecting tape termini does not require a sensor lamp and a photo-transistor, and thereby enables the miniaturization of a tape recorder.

38 Claims, 3 Drawing Sheets

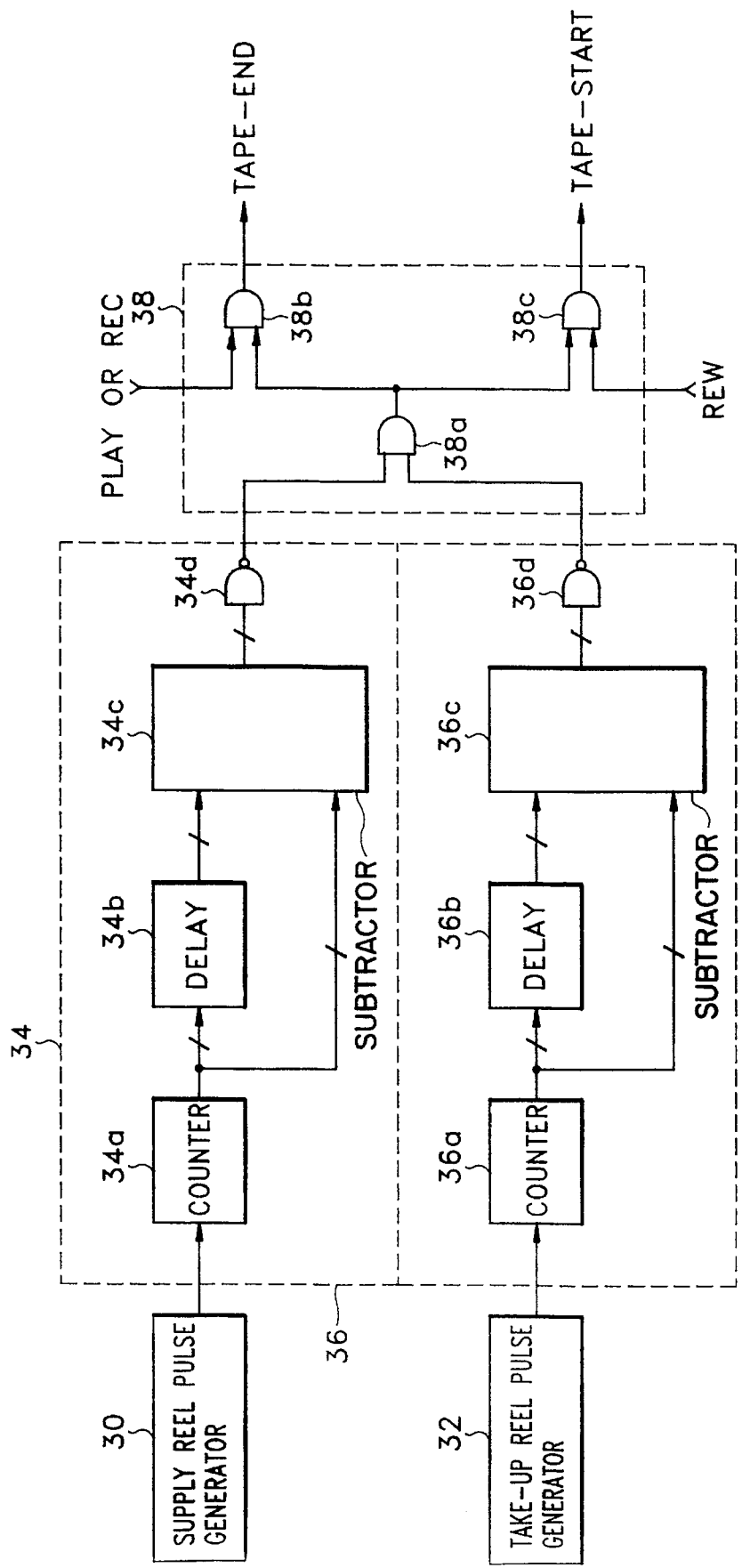

METHOD AND APPARATUS FOR DETECTING TAPE TERMINI IN A TAPE RECORDER

BACKGROUND OF THE INVENTION

The present invention relates generally to a method and an apparatus for detecting tape termini in a tape recorder, and more particularly, to a method and an apparatus for detecting the starting and ending points of a tape by checking the rotatory states of a take-up reel and a supply reel.

A video tape recorder ordinarily performs an automatic rewinding function such that if a tape is completely wound on the take-up reel in a reproducing mode, that is, the end of the tape has been reached, the tape is automatically rewound onto the supply reel, and once the rewinding is complete, that is, the tape is at the starting position again, tape operation stops. To perform such an automatic rewinding function, a transparent section of tape, called a lead tape, is secured to the opposite ends of a length of video tape. A tape terminus detecting circuit is utilized to check for light-transmission through the tape, which travels between a sensor lamp and a photo-transistor, thereby detecting starting and ending states of a tape. More particularly, a light signal emanating from the sensor lamp is received by the opposingly situated photo-transistor via the transparent lead tape section, thereby detecting the start or end of a tape.

However, the tape terminus detecting circuit using such an optical detecting method has suffered from a problem of abnormal operation when the sensitivity thereof is decreased by strain in the lead tape and even slight changes in the luminosity of the sensor lamp. Also, the photo-transistor is generally placed in a special case for preventing ambient light from causing abnormal operation of the photo-transistor. As a result, extra space is necessary for the installation of the case, which inhibits the miniaturization of the video tape recorder (VTR).

Based on the above, it can be appreciated that there presently exists a need in the art for a tape terminus detection method and apparatus which overcomes the above-described shortcomings and disadvantages of the presently available tape terminus detection technology. The present invention fulfills this need.

SUMMARY OF THE INVENTION

It is an object of the present invention to provide a tape terminus detecting method which does not require the use of an optical detection mechanism, such as, a sensor lamp and photo-transition.

It is another object of the present invention to provide a tape detecting apparatus suitable for implementing the tape terminus detecting method.

The tape terminus detecting method according to the present invention includes the steps of counting the number of rotations of a supply reel and a take-up reel for a predetermined period; determining the driving states of the supply reel and the take-up reel by comparing a counted value obtained from the counting step with the immediately preceding counted value; and detecting the starting and ending points or states of a tape (i.e., tape termini) according to the operation mode of a tape recorder and the driving states of the supply reel and the take-up reel determined as a result of the counted value comparison.

The tape terminus detecting apparatus according to the present invention includes a supply reel pulse generator for generating pulse signals in response to the rotation of a supply reel; a take-up reel pulse generator for generating pulse signals in response to the rotation of a take-up reel; a supply reel stop state determining means for determining a stop state of the supply reel in response the pulse signals generated by the supply reel pulse generator; a take-up reel stop state determining means for determining a stop state of the take-up reel in response to the pulse signals generated by the take-up reel pulse generator; and a tape starting and ending termini detecting means for detecting the starting and ending termini of a tape in response to outputs of the take-up reel and supply reel stop state determining means.

The method and apparatus for detecting tape termini according to the present invention detects the tape termini by taking advantage of the fact that the tape termini are reached when the supply reel and take-up reel reach their stop states.

Also, the starting or ending terminus of the tape is determined by referencing the operation mode of the tape recorder.

BRIEF DESCRIPTION OF THE DRAWINGS

These are various other features and advantages of the present invention will be readily understood with reference to the following detailed description taken in conjunction with the accompanying drawings, in which like reference numerals designate like structural elements, and, in which.

DETAILED DESCRIPTION OF THE INVENTION

Figure 1:
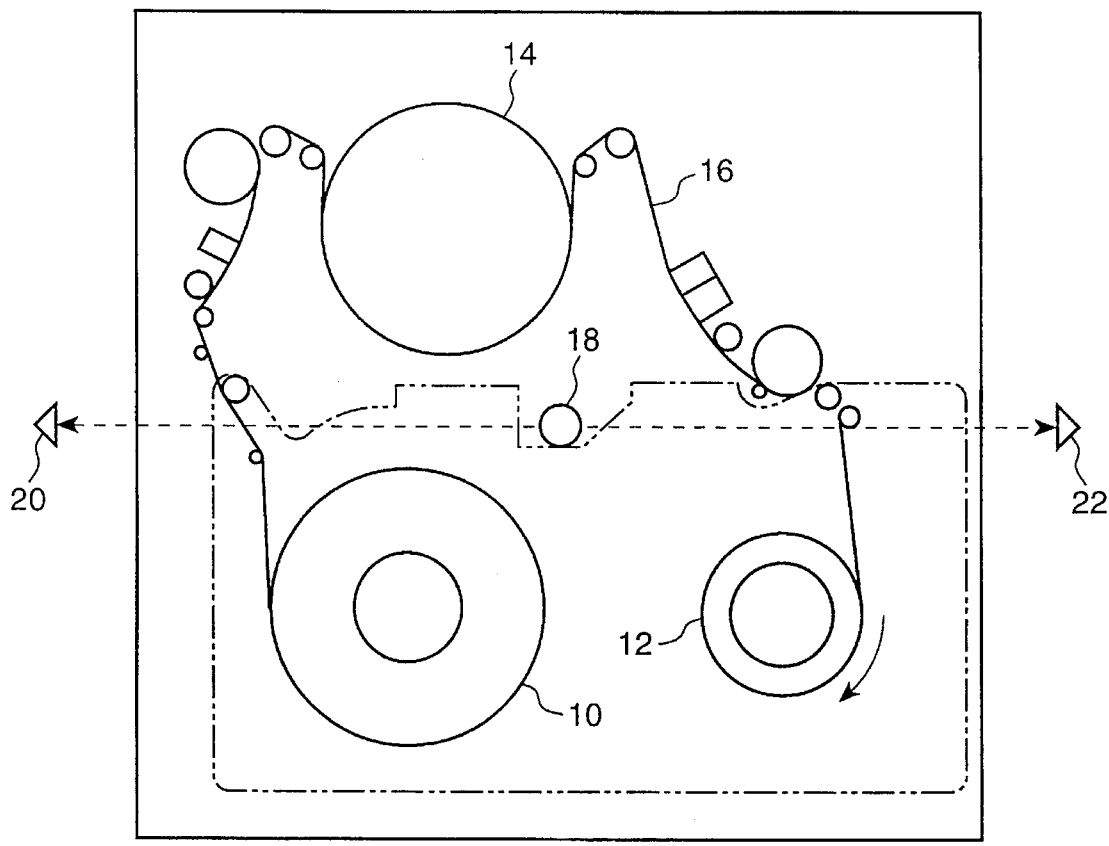
FIG. 1 is a diagram depicting a conventional tape terminus detecting apparatus.

FIG. 1 is a diagram of a conventional VTR, which includes a supply reel 10, a take-up reel 12, a drum 14, a tape 16, a sensor lamp 18, and an ending sensor 20 and a starting sensor 22, for detecting starting and ending lead tape portions, respectively.

During both recording and reproducing modes, take-up reel 12 is rotated in the direction of the arrow by a capstan motor (not shown) so that tape 16 is wound onto take-up reel 12 via drum 14. If the tape 16 is completely wound onto take-up reel 12 during the recording mode or reproducing mode, i.e., the end terminus of the tape has been reached, ending sensor 20 detects this condition, and a control portion (not shown) stops the capstan motor.

During a rewind mode, supply reel 10 is rotated by the capstan motor so that tape 16 is wound onto supply reel 10. If the tape is rewound to the starting portion of the tape, i.e., the start terminus of the tape has been reached, starting sensor 22 detects this condition, and the control portion stops the capstan motor.

However, the apparatus shown in FIG. 1 requires an apparatus (case) for shielding the light in order to prevent the erroneous operation of sensors 20 and 22 due to incidence of light (e.g., ambient light) other than the light from the sensor lamp 18. Also, there is the potential for malfunction if sensor lamp 18 burns out. Further, the installation of sensor lamp 18, sensors 20 and 22 is required.

Figure 2:
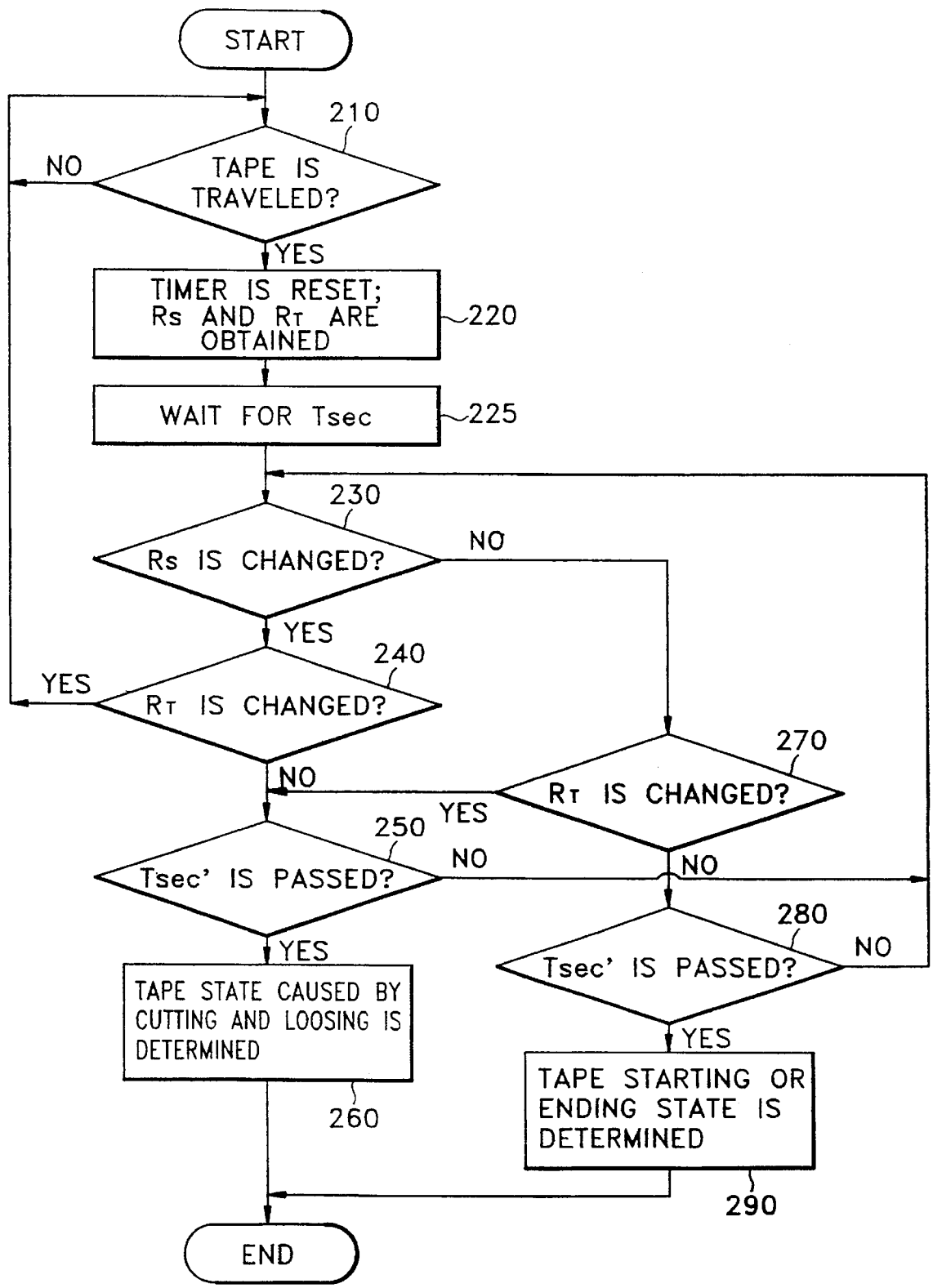
FIG. 2 is a flowchart of a tape terminus detecting method according to the present invention; and, FIG. 3 is a block diagram of a tape terminus detecting apparatus according to the present invention.

FIG. 2 is a flowchart of the operation of a tape terminus detecting apparatus constructed in accordance with the present invention. In step 210, it is determined whether the tape is travelling i.e., whether a reel is being rotated. Since the reel is rotated by the capstan motor, the reel rotation can be determined by detecting the operation state of the capstan motor. In step 220, a timer is reset and counted values Rs and Rt corresponding to a counted number of supply reel and take-up reel pulses, respectively, are obtained. Step 225 corresponds to a waiting period of about Tsec.

In steps 230–290 various determinations are made on the basis of the counted values Rs and Rt, for determining the driving state of the supply and take-up reels.

In step 230, changes in the counted value Rs are detected. If the counted value Rs has changed, the driving state of the supply reel is determined according to whether the counted value Rt has changed (step 240). If the counted value Rt has changed, the driving state of the supply reel is determined to be a normal state and a loop operation is performed by returning to step 210. If the counted value Rt has not changed, the driving state is determined as a state corresponding to rotation of only the supply reel. Step 250 corresponds to a waiting period of Tsec'. If the counted value Rt still has not changed after performing step 250, the driving state is determined as an abnormal state caused by the severing or loosening of the tape (step 260).

If the counted value Rs is determined to be unchanged at step 230, the driving state of the supply reel is determined according to the status of the counted value Rt (step 270). If the counted value Rt has changed, the driving state is determined as the state corresponding to rotation of only the take-up reel and the waiting step (step 250) is performed. If the counted value Rs has not changed even after performing step 250, the driving state is determined as an abnormal state caused by the severing or loosening of the tape (step 260).

If the counted value Rt has not changed, it is determined that a reel driving operation is not being performed. In this case, a step 280, which corresponds to another waiting period of Tsec', is performed. If the counted value Rt has not changed even after performing step 280, the state is determined as a termination of the tape (step 290), i.e., that the starting or ending terminus of the tape has been reached.

FIG. 3 is a block diagram of a tape terminus detecting apparatus constructed in accordance with the present invention, which includes a supply reel pulse generator 30, a take-up reel pulse generator 32, a supply reel stop state determination circuit 34 for determining the stop state of the supply reel, a take-up reel stop state determination circuit 36 for determining the stop state of the take-up reel, and a tape terminus detecting circuit 38.

The reel pulse generators 30 and 32 each generate a pulse signal (i.e., pulses) in response to reel rotation, e.g., one pulse per revolution of the respective reel. The respective pulse signals are generated by respective Hall devices (not shown) rotating together with a respective one of the reels or by respective circuits (not shown) for receiving and reflecting light emitted from a luminous diode off a reflecting board consisting of a black-and-white plane rotating with a respective one of the reels.

The stop state determination circuits 34,36 determine the stop state of the supply and take-up reels, respectively, in response to the pulses generated by the respective reel pulse generators 30,32, and include counters 34a and 36a, delay circuits 34b and 36b, subtractors 34c and 36c, and NAND gates 34d and 36d, respectively.

The counters 34a and 36a count the supply reel and take-up reel pulses generated by the reel pulse generators 30 and 32, respectively, and generate counted values representative of the number of counted pulses.

The delay circuits 34b and 36b, e.g., flip-flops, output the counted values generated by the counters 34a and 36a respectively, after delaying the counted values for a predetermined time (Tsec).

Subtractors 34c and 36c output difference values obtained by subtracting the counted values generated by the counters 34a and 36a from the delayed counted values outputted by delay circuits 34b and 36b, respectively. These counted values are different if the supply and take-up reels are being rotated. These counted values are the same only when the reel pulses are not generated by the reel pulse generators 30 and 32, which occurs when the reels are stopped, i.e., not rotated. If the difference value output from subtractors 34c and 36c is zero, it is determined that reel rotation has stopped for some reason.

NAND gates 34d and 36d detect whether the difference value output by the subtractors 34c and 36c respectively, is zero, and outputs a digital state signal having a logic high level only when all bits of the difference value applied thereto are low, i.e., when the difference value is zero. It should be recognized however that if the outputs of the subtractors 34c and 36c are limited to a single bit (high or low), then the NAND gates 34d and 36d could be dispensed with, in which case, the difference values generated by the subtractors 34c, 36c would be coupled to the respective inputs of first AND gate 38a directly.

Tape terminus detection circuit 38, comprised of three AND gates 38a, 38b and 38c, receives the state signals generated by the stop state determination circuits 34 and 36, and detects whether the tape is at a starting terminus or at an ending terminus. The first AND gate 38a receives the state signals generated by the stop state determination circuits 34 and 36 at respective inputs thereof. The output of the first AND gate 38a goes high, indicating that either the starting or ending terminus of the tape has been reached only when both inputs thereto are high.

The second AND gate 38b logically ANDs the output of the first AND gate 38a with a reproducing (PLAY) mode/ recording (REC) mode signal and outputs a "tape end" signal (TAPE_END) indicating that the ending terminus of the tape has been reached, when both inputs thereto are high.

The third AND gate 38c logically ANDs the output of the first AND gate 38a with a rewind (REW) mode signal and outputs a "tape start" signal (TAPE_START) indicating that the starting terminus of the tape has been reached, when both inputs thereto are high.

If the outputs of the second and third AND gates 38b and 38c are both low, it is determined that an abnormal operation state exists, which may be due to the severing or loosening of the tape.

As described above, the tape terminus detecting method according to the present invention detects the starting or ending termini of a tape by determining the driving states of the supply reel and take-up reel, thereby enabling the detection of the termini of the tape, regardless of tape strain.

Also, the tape terminus detecting apparatus according to the present invention does not require a sensor lamp and encased photo-transistor, thereby enabling the miniaturization of the tape recorder.

Although a presently preferred embodiment of the method and apparatus of the present invention has been described in detail hereinabove it should be clearly understood that many variations and/or modifications which may appear to those skilled in the art will still fall within the spirit and scope of the present invention as defined in the appneded claims. For example, although the present invention has been described in the context of its utilization in a video tape recorder it should be readily understood that it may just as easily be employed in an audio tape recorder. Further, although positive logic is employed in the disclosed apparatus, negative (inverse) logic could just as easily be employed.

What is claimed is:

1. A method for detecting a starting or ending terminus of a tape in a tape recording and playback device having a supply reel and a take-up reel, comprising the steps of:

generating first pulses in response to rotation of the supply reel;

generating second pulses in response to rotation of the take-up reel;

counting the first pulses, and generating a first count value indicative of the number of counted first pulses;

counting the second pulses, and generating a second count value indicative of the number of counted second pulses;

delaying said first pulses by a prescribed time delay period, and generating a delayed first count value;

delaying said second pulses by said prescribed time delay period, and generating a delayed second count value;

determining whether the supply reel is in a stop state by comparing said first value with said delayed first count value;

determining whether the take-up reel is in a stop state by comparing said second count value with said delayed second count value; and determining that the starting or ending terminus of the tape has been reached when the supply reel and the take-up reel are both determined to be in said stop states.

2. The method as set forth in claim 1, further comprising the steps of:

generating a first output signal in response to the supply reel stop state determining step, said first output signal being indicative of whether the supply reel is in said stop state; and, generating a second output signal in response to the take-up reel stop state determining step, said second output signal being indicative of whether the take-up reel is in said stop state.

3. The method as set forth in claim 2, further comprising the step of generating a third output signal in response to the generating a first output signal and the generating a second output signal steps, said third output signal having a first logic level when said first and second output signals both indicate said stop states.

4. The method as set forth in claim 3, further comprising the steps of:

providing a first mode indication signal indicative of whether the tape recording and playback device is in either a recording or playback mode of operation, said first mode indication signal being at said first logic level when the tape recording and playback device is in either the recording or playback mode of operation;

generating a fourth output signal indicative of whether said first mode indication signal and said third output signal are both at said first logic level;

providing a second mode indication signal indicative of whether the tape recording and playback device is in a rewind mode of operation, said second mode indication signal being at said first logic level when the tape recording and playback device is in the rewind mode of operation; and, generating a fifth output signal indicative of whether said second mode indication signal and said third output signal are both at said first logic level.

5. The method as set forth in claim 4, wherein when said fourth output signal is at said first logic level, the tape is determined to have reached its starting terminus, and when said fifth output signal is at said first logic level, the tape is determined to have reached its ending terminus.

6. An apparatus for detecting a starting and ending terminus of a tape in a tape recording and playback device having a supply reel and a take-up reel, comprising:

(a) a supply reel pulse generator for generating first pulses in response to rotation of the supply reel;

(b) a take-up reel pulse generator for generating second pulses in response to rotation of the take-up reel;

(c) a supply reel stop state determination circuit for determining a stop state of the supply reel in response to said first pulses, and generating a first difference value indicative of this determination;

(d) a take-up reel stop state determination circuit for determining a stop state of the take-up reel in response to said second pulses, and generating a second difference value indicative of this determination; and (e) a tape terminus detection circuit for detecting the starting and ending terminus of the tape in response to said first and second difference values, said tape terminus detection circuit comprising (1) a first logic gate having a first input coupled to said first difference value and a second input coupled to said second difference value, said first logic gate generating an output having a first logic level when said first and second difference values both indicate a zero difference value, (2) a second logic gate having a first input coupled to said output of said first logic gate, and a second input coupled to a first mode indication signal, said second logic gate generating an output indicative of the ending terminus of the tape being reached when said output of said first logic gate and said first mode indication signal are both at said first logic level, and (3) a third logic gate having a first input coupled to said output of said first logic gate, and a second input coupled to a second mode indication signal, said third logic gate generating an output indicative of the starting terminus of the tape being reached when said output of said first logic gate and said second mode indication signal are both at said first logic level.

7. The apparatus as set forth in claim 6, wherein:

said supply reel pulse generator generates one pulse per revolution of the supply reel; and said take-up reel pulse generator generates one pulse per revolution of the take-up reel.

8. The apparatus as set forth in claim 6, wherein said supply reel stop state determination circuit comprises (a) a first counter for counting said first pulses, and for generating a first count value indicative of the number of said first pulses counted by said first counter, (b) a first delay circuit for delaying said first count value for a predetermined delay period, and for generating a first delayed count value, and (c) a first subtractor for determining the difference between said first count value and said first delayed count value, and for generating said first difference value indicative of the determined difference;

and wherein said take-up reel stop state determination circuit comprises (a) a second counter for counting said second pulses, and for generating a second count value indicative of the number of said second pulses counted by said second counter, (b) a second delay circuit for delaying said second count value for said predetermined delay period, and for generating a second delayed count value, and (c) a second subtractor for determining the difference between said second count value and said second delayed count value, and for generating said second difference value indicative of the determined difference.

9. The apparatus as set forth in claim 6, wherein said first mode indication signal is indicative of whether the tape recording and playback device is in either a recording or playback mode of operation.

10. The apparatus as set forth in claim 9, wherein said second mode indication signal is indicative of whether the tape recording and playback device is in a rewind mode of operation.

11. The apparatus as set forth in claim 6, wherein the tape recording and playback device is a video tape recorder.

12. An apparatus for detecting a starting and ending terminus of a tape in a tape recording and playback device having a supply reel and a take-up reel, comprising:

(a) a supply reel pulse generator for generating first pulses in response to rotation of the supply reel;

(b) a take-up reel pulse generator for generating second pulses in response to rotation of the take-up reel;

(c) a supply reel stop state determination circuit for determining a stop state of the supply reel in response to said first pulses, said supply reel stop state determination circuit comprising
  (1) a first counter for counting said first pulses, and for generating a first count value indicative of the number of said first pulses counted by said first counter,
  (2) a first delay circuit for delaying said first count value for a predetermined delay period, and for generating a fist delayed count value, and
  (3) a first subtractor for determining the difference between said first count value and said first delayed count value, and for generating a first difference value indicative of the determined difference;

(d) a take-up reel stop state determination circuit for determining a stop state of the take-up reel in response to said second pulses, and generating a second difference value indicative of this determination; and (e) a tape terminus detection circuit for detecting the starting and ending terminus of the tape in response to said first and second difference values.

13. The apparatus as set forth in claim 1, wherein:

said supply reel pulse generator generates one pulse per revolution of the supply reel; and, said take-up reel pulse generator generates one pulse per revolution of the take-up reel.

14. The apparatus as set forth in claim 12, wherein said tape terminus detection circuit comprises:

a first logic gate having a first input coupled to said first difference value and a second input coupled to said second difference value, said first logic gate generating an output having a first logic level when said first and second difference values both indicate a zero difference value;

a second logic gate having a first input coupled to said output of said first logic gate, and a second input coupled to a first mode indication signal, said second logic gate generating an output indicative of the ending terminus of the tape being reached when said output of said first logic gate and said first mode indication signal are both at said first logic level; and, a third logic gate having a first input coupled to said output of said first logic gate, and a second input coupled to a second mode indication signal, said third logic gate generating an output indicative of the starting terminus of the tape being reached when said output of said first logic gate and said second mode indication signal are both at said first logic level.

15. The apparatus as set forth in claim 14, wherein said first mode indication signal is indicative of whether the tape recording and playback device is in either a recording or playback mode of operation.

16. The apparatus as set forth in claim 15, wherein said second mode indication signal is indicative of whether the tape recording and playback device is in a rewind mode of operation.

17. The apparatus as set forth in claim 12, wherein said tape terminus detection circuit comprises:

a first AND gate having a first input coupled to said first difference value and a second input coupled to said second difference value;

a second AND gate having a first input coupled to an output of said first AND gate, and a second input coupled to a first mode indication signal, said second AND gate generating an output indicative of the ending terminus of the tape being reached; and, a third AND gate having a first input coupled to an output of said first AND gate, and a second input coupled to a second mode indication signal, said third AND gate generating an output indicative of the starting terminus of the tape being reached.

18. The apparatus as set forth in claim 12, wherein said first difference value is comprised of plural bits, and said supply reel stop state determination circuit further comprises a first NAND gate which receives said plural bits of said first difference value, and generates an output in response thereto.

19. The apparatus as set forth in claim 18, wherein said second difference value is comprised of plural bits, and said take-up reel stop state determination circuit further comprises a second NAND gate which receives said plural bits of said second difference value, and generates an output in response thereto.

20. The apparatus as set forth in claim 19, wherein said tape terminus detection circuit comprises:

a first logic gate having a first input coupled to said output of said first NAND gate, and a second input coupled to said output of said second NAND gate, said first logic gate generating an output having a first logic level when said outputs of said first and second NAND gates both indicate a zero difference value;

a second logic gate having a first input coupled to said output of said first logic gate, and a second input coupled to a first mode indication signal, said second logic gate generating an output indicative of the ending terminus of the tape being reached when said output of said first logic gate and said first mode indication signal are both at said first logic level; and, a third logic gate having a first input coupled to said output of said first logic gate, and a second input coupled to a second mode indication signal, said third logic gate generating an output indicative of the starting terminus of the tape being reached when said output of said first logic gate and said second mode indication signal are both at said first logic level.

21. The apparatus as set forth in claim 19, wherein said tape terminus detection circuit comprises:

a first AND gate having a first input coupled to said output of said first NAND gate, and a second input coupled to said output of said second NAND gate;

a second AND gate having a first input coupled to said output of said first AND gate, and a second input coupled to a first mode indication signal, said second AND gate generating an output indicative of the ending terminus of the tape being reached; and, a third AND gate having a first input coupled to said output of said first AND gate, and a second input coupled to a second mode indication signal, said third AND gate generating an output indicative of the starting terminus of the tape being reached.

22. The apparatus as set forth in claim 19, wherein said first mode indication signal is indicative of whether the tape recording and playback device is in either a recording or playback mode of operation.

23. The apparatus as set forth in claim 22, wherein said second mode indication signal is indicative of whether the tape recording and playback device is in a rewind mode of operation.

24. The apparatus as set forth in claim 12, wherein the tape recording and playback device is a video tape recorder.

25. The apparatus as set forth in claim 12, wherein said take-up reel stop state determination circuit comprises:

a second counter for counting said second pulses, and for generating a second count value indicative of the number of said second pulses counted by said second counter, a second delay circuit for delaying said second count value for said predetermined delay period, and for generating a second delayed count value, and a second subtractor for determining the difference between said second count value and said second delayed count value, and for generating said second difference value indicative of the determined difference.

26. An apparatus for detecting a starting and ending terminus of a tape in a tape recording and playback device having a supply reel and a take-up reel, comprising:

(a) a supply reel pulse generator for generating first pulses in response to rotation of the supply reel;

(b) a take-up reel pulse generator for generating second pulses in response to rotation of the take-up reel;

(c) a supply reel stop state determination circuit for determining a stop state of the supply reel in response to said first pulses, and generating a first difference value indicative of this determination;

(d) a take-up reel stop state determination circuit for determining a stop state of the take-up reel in response to said second pulses, said take-up reel stop state determination circuit comprising (1) a counter for counting said second pulses, and for generating a count value indicative of the number of said pulses counted by said counter, (2) a delay circuit for delaying said count value for a predetermined delay period, and for generating a delayed count value, and (3) a subtractor for determining the difference between said count value and said delayed count value, and for generating a second difference value indicative of the determined difference; and (e) a tape terminus detection circuit for detecting the starting and ending terminus of the tape in response to said first and second difference values.

27. The apparatus as set forth in claim 26, wherein:

said supply reel pulse generator generates one pulse per revolution of the supply reel; and said take-up reel pulse generator generates one pulse per revolution of the take-up reel.

28. The apparatus as set forth in claim 26, wherein said tape terminus detection circuit comprises:

a first logic gate having a first input coupled to said first difference value and a second input coupled to said second difference value, said first logic gate generating an output having a first logic level when said first and second difference values both indicate a zero difference value;

a second logic gate having a first input coupled to said output of said first logic gate, and a second input coupled to a first mode indication signal, said second logic gate generating an output indicative of the ending terminus of the tape being reached when said output of said first logic gate and said first mode indication signal are both at said first logic level; and a third logic gate having a first input coupled to said output of said first logic gate, and a second input coupled to a second mode indication signal, said third logic gate generating an output indicative of the starting terminus of the tape being reached when said output of said first logic gate and said second mode indication signal are both at said first logic level.

29. The apparatus as set forth in claim 28, wherein said first mode indication signal is indicative of whether the tape recording and playback device is in either a recording or playback mode of operation.

30. The apparatus as set forth in claim 29, wherein said second mode indication signal is indicative of whether the tape recording and playback device is in a rewind mode of operation.

31. The apparatus as set forth in claim 26, wherein said tape terminus detection circuit comprises:

a first AND gate having a first input coupled to said first difference value and a second input coupled to said second difference value;

a second AND gate having a first input coupled to an output of said first AND gate, and a second input coupled to a first mode indication signal, said second AND gate generating an output indicative of the ending terminus of the tape being reached; and a third AND gate having a first input coupled to an output of said first AND gate, and a second input coupled to a second mode indication signal, said third AND gate generating an output indicative of the starting terminus of the tape being reached.

32. The apparatus as set forth in claim 26, wherein said first difference value is comprised of plural bits, and said supply reel stop state determination circuit further comprises a first NAND gate which receives said plural bits of said first difference value, and generates an output in response thereto.

33. The apparatus as set forth in claim 32, wherein said second difference value is comprised of plural bits, and said take-up reel stop state determination circuit further comprises a second NAND gate which receives said plural bits of said second difference value, and generates an output in response thereto.

34. The apparatus as set forth in claim 33, wherein said tape terminus detection circuit comprises:

a first logic gate having a first input coupled to said output of said first NAND gate and a second input coupled to said output of said second NAND gate, said first logic gate generating an output having a first logic level when said outputs of said first and second difference NAND gates both indicate a zero value;

a second logic gate having a first input coupled to said output of said first logic gate, and a second input coupled to a first mode indication signal, said second logic gate generating an output indicative of the ending terminus of the tape being reached when said output of said first logic gate and said first mode indication signal are both at said first logic level; and a third logic gate having a first input coupled to said output of said first logic gate, and a second input coupled to a second mode indication signal, said third logic gate generating an output indicative of the starting terminus of the tape being reached when said output of said first logic gate and said second mode indication signal are both at said first logic level.

35. The apparatus as set forth in claim 33, wherein said tape terminus detection circuit comprises:

a first AND gate having a first input coupled to said output of said first NAND gate and a second input coupled to said output of said second NAND gate;

a second AND gate having a first input coupled to an output of said first AND gate, and a second input coupled to a first mode indication signal, said second AND gate generating an output indicative of the ending terminus of the tape being reached; and a third AND gate having a first input coupled to an output of said first AND gate, and a second input coupled to a second mode indication signal, said third AND gate generating an output indicative of the starting terminus of the tape being reached.

36. The apparatus as set forth in claim 33, wherein said first mode indication signal is indicative of whether the tape recording and playback device is in either a recording or playback mode of operation.

37. The apparatus as set forth in claim 36, wherein said second mode indication signal is indicative of whether the tape recording and playback device is in a rewind mode of operation.

38. The apparatus as set forth in claim 26, wherein the tape recording and playback device is a video tape recorder.

* * * * *